Jan. 24, 1939. C. HARBISON 2,144,657
EGG CANDLING MACHINE
Filed June 17, 1938 2 Sheets-Sheet 1

Inventor
Charles Harbison,
By
Attorney

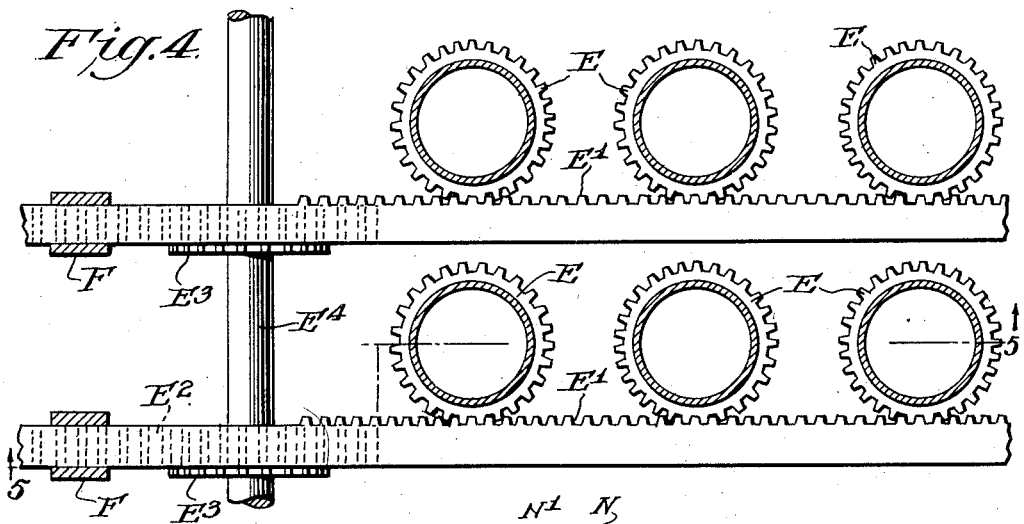
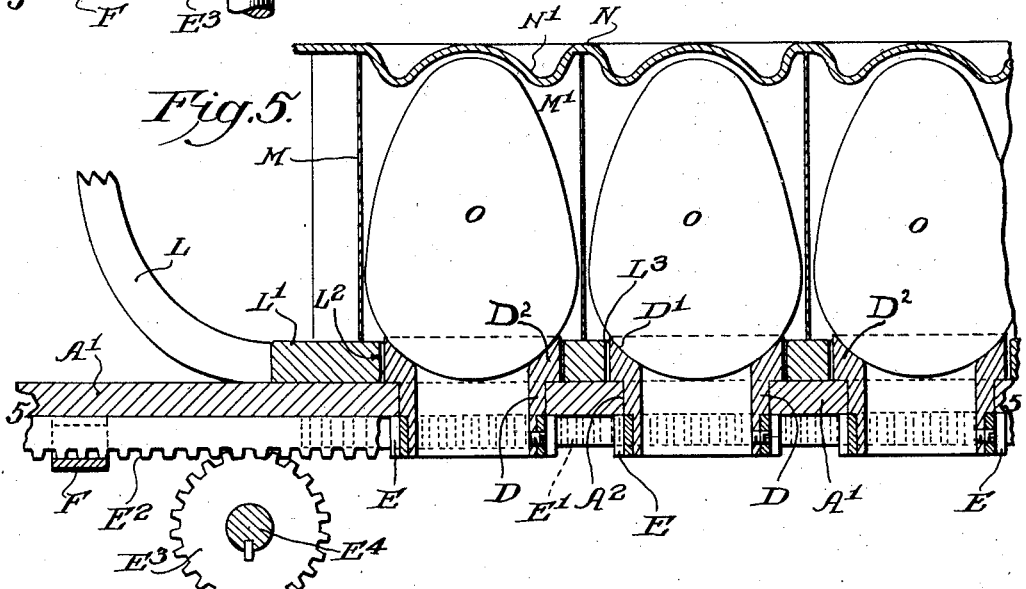
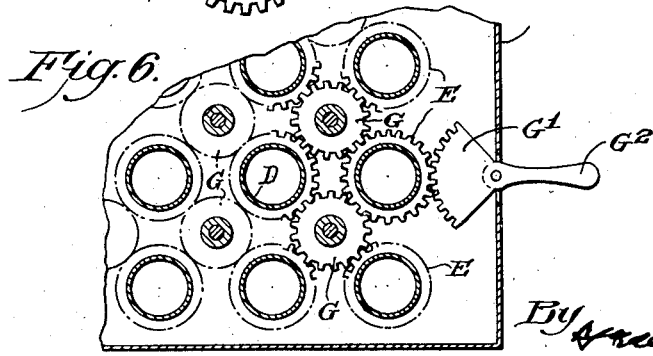

Patented Jan. 24, 1939

2,144,657

UNITED STATES PATENT OFFICE 2,144,657

EGG CANDLING MACHINE

Charles Harbison, Philadelphia, Pa.

Application June 17, 1938, Serial No. 214,184

4 Claims. (Cl. 88—14.6)

My invention relates to egg candling machines and has for its object to provide a simple and efficient mechanism whereby eggs contained in what is called in the art a "filler" can be bodily transported to and retracted from a series of spaced annular rotatable egg cups secured in the top of a light box and through which light is transmitted from the light box to the eggs supported on said egg cups.

It will be understood that eggs are packed for handling and transmission in crates which are filled by a number of "fillers" and "flats", the fillers being made up of strips of cardboard or the like so interengaged as to form a series of squares somewhat deeper than the normal length of an egg and the sides of which are so spaced as to be distant from each other by slightly more than the normal breadth of an egg. Each of the fillers rests upon what is called a "flat", also of cardboard or the like, upon which the ends of the eggs located in the box like compartments of the filler rest normally with the pointed ends contacting with the flat and the flats by preference being slightly dished in the portion which is contacted by the end of the egg so as to tend to keep the egg in upright position. The normal egg capacity for each filler is thirty-six eggs and the construction which I have described is standardized.

The essential feature of my machine consists in providing a light box with a series of annular rotatable egg receiving cups extending through the top of the light box and opening into the light box, said annular egg receiving cups being spaced to correspond with the ordinary spacing of the eggs contained in a filler and the upper ends of said egg cups on which the eggs rest while being candled extending above the top of the light box. In accordance with my invention, I pivotally support at one side of the egg box a tray rotatable in an outward direction to a position in which it will be adapted to receive and position a "filler" and "flat" charged with eggs and rotatable to an inner position in which it will extend over the tops of the annular egg cups and I further provide a pivoted grid rotatable on approximately the same axis as the tray from an outer position in which it will approximately rest upon the top of a "filler" resting on the tray and so spaced as to lie approximately parallel to the tray and rotatable to an inner position in which it will approximately rest upon the top of the light box, said grid being formed with a series of openings spaced to correspond with the spacing of the annular egg cups and of slightly greater diameter than the external diameter of the egg cups and of less diameter than the normal breadth of an egg. By preference, I secure the grid to a rotary shaft having attached to it a counterweight, the operation of which is to normally hold and return the grid to an upright position and I pivot the tray upon this same shaft.

By preference also I provide for the operation of my machine electric lights located in the light box and other electric lights located outside of the light box and provide electric wiring for connecting the lighting system to a source of electricity having a switch normally opening the circuit connected with the light bulbs in the light box and closing the circuit to the external lights and I provide switch actuating mechanism operable by the movement of the parts transporting the eggs to and from the annular egg cups so as to close the circuit leading to the light bulbs within the light box as the eggs are deposited on the annular egg cups and simultaneously cut off the current from the external light bulbs.

My invention will be best understood as described in connection with the drawings in which Figure 1 is a plan view of my apparatus, the parts being in the position which they occupy during the actual candling of the eggs.

Figure 4 is a fragmentary sectional view of approximately full size taken as on the line 4—4 of Fig. 2.

Figure 5 is a fragmentary section of approximately full size taken as on the line 5—5 of Fig. 4, through the center of the egg cups, but showing eggs in position on the cups sectioned through the grid, filler and flat, and Figure 6 is a plan view illustrating a modification of the means for rotating the annular egg cups.

Figure 1:
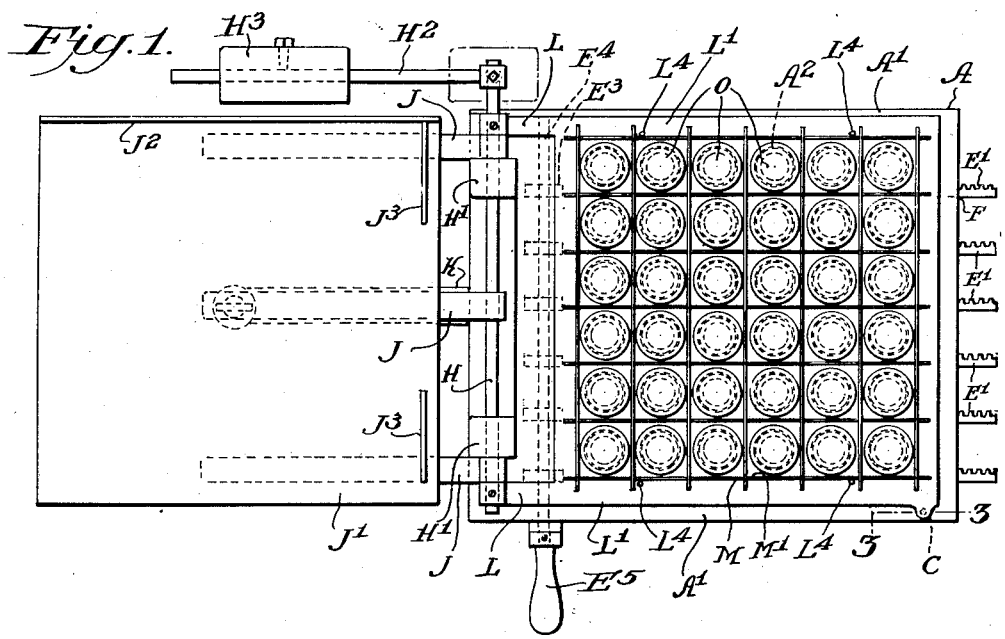
Figure 2:
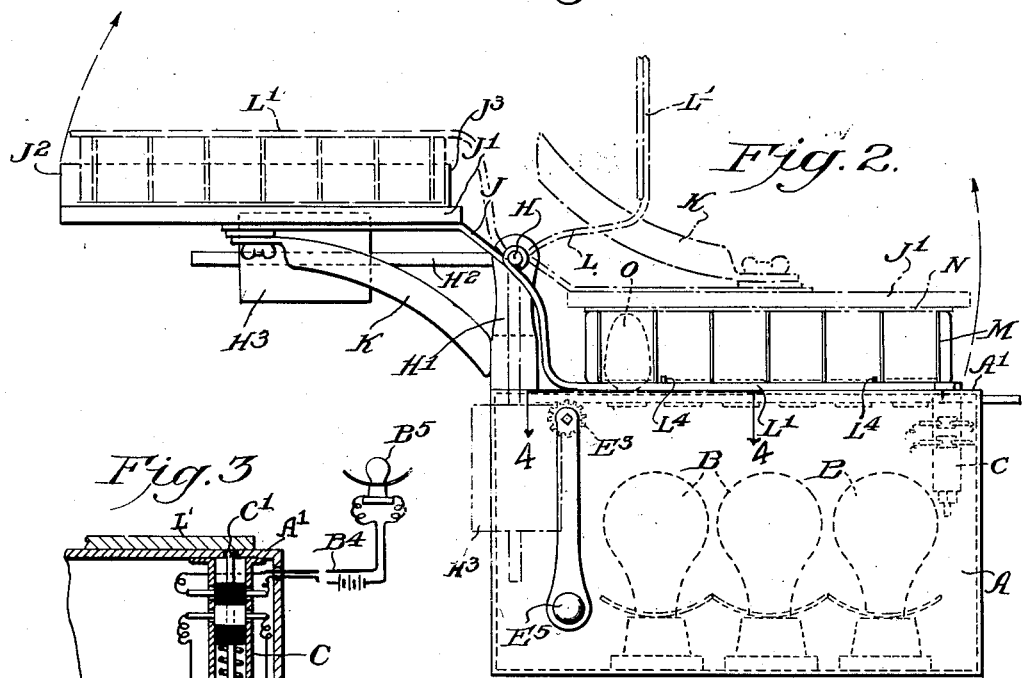
Figure 2 is a side elevation of the apparatus taken from the right hand side of Fig. 1.
Figure 3:
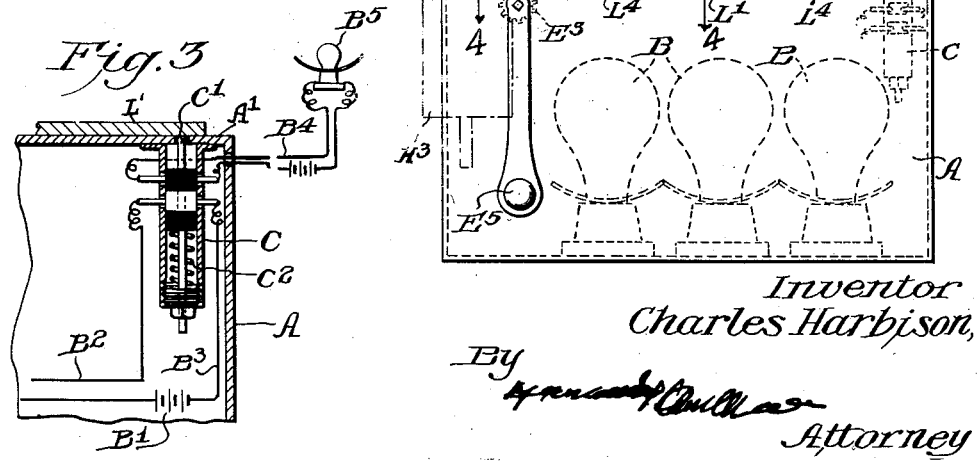
Figure 3 is a cross-section on the line 3—3 of Fig. 1, taken through the switch mechanism by which the lighting means within and without the light box are brought into operation at proper times.

A indicates the light box, the top $A^1$ of which is formed with a series of substantially circular openings $A^2$ corresponding in number and spacing to the egg containing compartments of the filler. A series of electric light bulbs such as are indicated at B, B, etc. in Fig. 2, are located in the light box and connected with a source of electric current $B^1$ by electric wires indicated at $B^2$, $B^3$, $B^3$ indicating the wiring connected to the source of current. A third wire, $B^4$, leads to means for lighting the chamber in which the box is located, indicated as a bulb $B^5$, and the three wires connect with a switch indicated at C and actuated by a push button $C^1$ extending through the top of the box, the switch normally connecting the wires $B^2$ and $B^3$ being actuated by a spring $C^2$ which thrusts the push button $C^1$ upward. When the push button is pushed down the switch connects the wires $B^2$ and $B^3$ and opens the circuit including the wire $B^4$. D, D, etc., indicate a series of hollow cylinders extending through the circular openings $A^3$ in the top of the light box A, the upper ends $D^1$ of which form annular egg cups. The cylinders D are formed with annular shoulders $D^2$ which support them on the top of the box top $A^1$ and on the other side of the box top they are provided with gear wheels E, E, etc., which, as shown in Figs. 4 and 5, are engaged by reciprocable toothed racks, indicated at $E^1$, moving in guides F. The ends of the rack bars are provided with downwardly facing toothed racks, indicated at $E^2$, which are engaged by gear wheels $E^3$ secured on a shaft $E^4$, to one end of which is secured a crank handle, indicated at $E^5$.

In the modified mechanism for giving a rotary movement to the egg cups indicated in Fig. 6, the gear wheels E are geared together by a series of gear wheels G, G, etc., and an oscillatory rotary movement is given to the whole system by means of a toothed sector $G^1$, engaged with one of the gear wheels E and actuated by a lever $G^2$.

H indicates a rotatable shaft supported on standards $H^1$, $H^1$, located at one end of the light box and having attached to it, as shown, an arm $H^2$ to which is connected a counterweight $H^3$ adapted to return and hold the shaft to one angular position. Pivotally supported on the shaft H by means of arms J is a tray $J^1$, the location of the shaft and its connection to the tray $J^1$ being such that the tray can be swung from a receiving position, such as indicated in Fig. 2, to a position such as indicated in dot and dash lines in the same figure, in which it will extend over and lie approximately parallel to the tops of the annular egg cups $D^1$. As shown, the tray $J^1$, in its outer or receiving position, is supported on a bracket K attached thereto. It will be understood that the tray is of such dimensions as to extend beneath a filler and to insure the correct spacing of the filler upon the tray, it is advisable to have engaging stops, such as indicated at $J^2$ and $J^3$. Secured to the shaft H by arms L, L, is a grid indicated at $L^1$, its connection with the shaft being such that it can swing outward to a position extending over the tray $J^1$ and substantially parallel to it and spaced from the tray by approximately the depth of a filler and flat resting on the tray and can be swung in the other direction to a position in which it will approximately rest upon the top of the light box, the construction being also such that the tray and grid in swinging from one position to the other will remain parallel to each other and practically retain their spacing from each other. The grid is formed with a series of circular openings $L^2$ which are of slightly larger diameter than the egg cups $D^1$ of the cylinders and of less diameter than the normally greater diameter of the eggs packed in the filler so that the upper edges $L^3$ of the openings $L^2$ will serve as supports for the eggs and the thickness of the grid is such that when swung over upon the top $A^1$ of the light box A its upper surface will lie slightly below the top surfaces of the annular egg cups $D^1$. To assist in maintaining the filler in proper registering position the side of the grid which contacts with the filler is provided with fingers, as indicated at $L^4$, $L^4$, etc. which, when the grid is in contact with the filler, lie in contact with its sides.

The ordinary standard filler is indicated at M and is divided into thirty-six rectangular compartments, the compartments being indicated at $M^1$. N indicates the flat, one of which normally underlies each filler and is preferably formed with depressions, as indicated at $N^1$, serving to maintain the proper alignment of the eggs when the filler is charged. O, O, etc., indicate eggs.

In operation the grid $L^1$ is normally in upright position, as shown in Fig. 2, in dot and dash lines, this being effected by the counterweight $H^3$ and the tray $J^1$ is in its outwardly extending position, resting on the support K, and the electric switch C is held in position to cut off the current to the light bulbs B in the light box and connect the external light bulbs $B^5$. The operator then places a charged filler and an underlying flat upon the tray $J^1$, as indicated in dash lines in Fig. 2, and then turns the grid $L^1$ down upon the top of the filler, as shown in dot and dash lines in Fig. 2, and then turns the tray $J^1$ and grid $L^1$ upward and inward until the grid rests upon or approximately upon the top $A^1$ of the light box, as shown in full lines in Fig. 2. During the latter part of this turning movement the eggs in the filler are supported on the edges $L^3$ of the circular holes $L^2$ of the grid until these openings pass over the annular egg cups $D^1$, depositing the eggs upon the annular egg cups $D^1$. As the grid approaches the top of the light box it contacts with the push button $C^1$, shifting the switch C to close the circuit leading to the light bulbs B in the light box A and cut off the current leading to the external light bulb or bulbs indicated at $B^5$. The operator then swings the tray $J^1$ back to receiving position, removes the flat N, operates the gearing for rotating the annular egg cups as by means of the crank $E^5$ and observes the eggs which, by reason of the light transmitted through them from the light box, will show to the experienced observer defective eggs which can be removed. The flat N is then replaced over the filler M, the tray swung back to contact with the flat and the tray and grid rotated backward to the original receiving position. The operator then releases the grid which is returned to its upright position by the counterweight $H^3$, the filler and flat with the candled eggs are removed and the machine is then in position for the handling of another charged filler.

Having now described my invention, what I claim as new and desire to secure by Letters Patent, is:

1. An egg candling machine comprising a light box, the top wall of which is formed with spaced openings corresponding in disposition to the egg receiving chambers of the fillers used in the packing and transportation of eggs, a series of rotatable annular egg receiving cups located in said openings the annuli of which open into the light box and means for imparting rotary motion to said annular egg cups, in combination with a tray so pivotally supported as to be rotatable from a receiving position in which it extends outward from the light box to a position in which it extends above the tops of the egg cups extending through the top of the light box and a grid approximately co-axially supported with the tray and rotatable on said axis from an outer position in which it is approximately parallel with the tray in its receiving position and spaced therefrom by approximately the depth of an egg filler to an inner position in which it approximately contacts with the top of the light box, said grid having openings formed through it of slightly larger diameter than the outer diameter of the rotatable egg cups, said openings being spaced to pass over said egg cups when the grid is rotated toward the top of the light box and the inner edges of said openings of the grid being of less diameter than the greatest diameter of a normal egg so as to be adapted to serve as a support for the eggs, when they rest upon the grid.

2. An egg candling machine as called for in claim 1, in which the light box is provided with electric light bulbs, an electric circuit for connecting said bulbs with a source of electricity, a normally open switch in said electric circuit and means for temporarily closing said switch to energize the electric lights actuated by the movement of the grid as it reaches its lowermost position with regard to the top of the light box.

3. An egg candling machine as called for in claim 1, in which the axially supported grid is provided with counterweighting means operative to normally hold the grid in substantially upright position.

4. An egg candling machine as called for in claim 1, in which the axial support for the grid consists of a rotatable shaft to which the grid is attached and to which is also attached a counterweight operative to normally hold the grid in approximately upright position and in which the tray is pivotally supported upon said rotatable shaft.

CHARLES HARBISON.